UNITED STATES PATENT OFFICE.

WILHELM PICKHARDT, OF NEW YORK, AND HERMANN ENDEMANN, OF BROOKLYN, N. Y.

MANUFACTURE OF CHINOLINE.

SPECIFICATION forming part of Letters Patent No. 254,098, dated February 21, 1882.

Application filed December 6, 1881. (Specimens.)

*To all whom it may concern:*

Be it known that we, WILHELM PICKHARDT, a citizen of the United States, residing at New York, in the county and State of New York, and HERMANN ENDEMANN, a citizen of the United States, residing at Brooklyn, in the county of Kings and State of New York, have invented new and useful Improvements in the Manufacture of Artificial Chinoline, of which the following is a specification.

This invention relates to an improvement in the chinoline described in Letters Patent No. 241,738, granted to Zdenko H. Skraup, May 17, 1881. In this patent the product of Skraup is described as a colorless liquid which, when exposed to the air, assumes a reddish-brown color. Our experiments led us to believe that this change in color by the action of the air is due to the presence of traces of aniline and other impurities which are deleterious to the health, and since our chinoline is intended particularly for medical purposes, we have endeavored to remove from it all foreign matters.

Our invention consists in a chinoline which is a colorless liquid and which does not assume any color by exposure to the air.

In carrying out our invention we take the chinoline of Skraup, or we prepare such chinoline in accordance with the patent of Skraup above named, and then we treat the same with tartaric acid. In order to convert all bases mixed with the chinoline into acid salts, we use an excess of acid. For instance, we take about one hundred and sixty parts, by weight, of tartaric acid, dissolve the same in about eight hundred parts of water, and after the solution has been heated to about 100° Celsius we add one hundred and thirty parts of chinoline. The tartrate of chinoline which is formed by this reaction dissolves in the heated solution, and on cooling it crystallizes, while the excess of the acid, together with the impurities, remain in the mother-liquor. The crystals are then brought upon a filter and freed from the mother-liquor by washing with water or other mechanical means. The acid tartrate of chinoline which is obtained by this process is then dissolved in water, and by adding to this solution caustic potash or soda the chinoline is liberated and caused to collect in oily drops either at the bottom or surface of the liquid, which depends upon the specific gravity of the aqueous solution. The chinoline thus produced is separated from the solution by passing steam through the solution, whereby the chinoline is carried off, and the chinoline is then condensed with the water, in which it sinks to the bottom as an oily liquid, and from which it is separated by mechanical means, such as a separating-funnel or a siphon. The water still contained in the chinoline is separated by heat or by the aid of solid caustic potash. For further purification the product is distilled, and it then forms a colorless liquid, which remains colorless when exposed to the action of the air, thus showing that it is free from the impurities mixed within the chinoline of Skraup.

What we claim as new, and desire to secure by Letters Patent, is—

1. The within-described process of preparing and refining chinoline by exposing the chinoline of Skraup to the action of tartaric acid, then separating from the solution the acid tartrate of chinoline, and finally, liberating from this acid tartrate the chinoline by the action of caustic alkalies.

2. The refined chinoline hereinbefore described and having the characteristics above set forth.

In testimony whereof we have hereunto set our hands and seals in the presence of two subscribing witnesses.

WM. PICKHARDT. [L. S.]
H. ENDEMANN. [L. S.]

Witnesses:
W. HAUFF,
E. F. KASTENHUBER.